3,842,147
CRYSTALLINE POLY-ALPHA-OLEFINE COMPOSITION HAVING IMPROVED DYEABILITY

Toshiharu Tomatu, Otake, and Tadao Iwata, Iwakuni, Japan, assignors to Mitsui Petrochemical Industries, Ltd., Tokyo, Japan
No Drawing. Filed Nov. 3, 1972, Ser. No. 303,513
Int. Cl. C08f 37/18
U.S. Cl. 260—897 B          8 Claims

ABSTRACT OF THE DISCLOSURE

A crystalline poly-α-olefine composition comprising:
(A) a crystalline poly-α-olefine, and
(B) a water-insoluble modified poly-α-olefine having units of the following formula

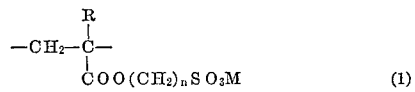     (1)

wherein R is a hydrogen atom and/or methyl group, M is an alkali metal, and $n$ is an integer of 3 to 4.

---

This invention relates to a crystalline poly-α-olefine composition having improved dyeability with basic dyestuffs, in particular high cationic dyestuffs, enhanced printability with printing ink, excellent heat stability at the time of melt molding, excellent spinnability and adaptability to other melt-shaping operations, and desirable physical and chemical properties inherent to crystalline poly-α-olefines.

More specifically, this invention relates to a crystalline poly-α-olefine composition which comprises the following polymer (A) and polymer (B):

(A) a crystalline poly-α-olefine, and
(B) a water-insoluble modified poly-α-olefine having units of the following formula

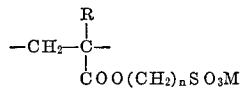

wherein R is a hydrogen atom and/or methyl group, M is an alkali metal, and $n$ is 3 or 4.

Known hitherto as modified poly-α-olefines are those containing sulfonic acid groups obtained by reacting poly-α-olefines having carboxyl groups in the form of their salts with bases, with cyclic sulfonic acid esters (B.P. 1,042,719). According to this proposal, the modified poly-α-olefine prepared by treating ethylenemaleic anhydride copolymer containing carboxyl groups in the form of its sodium salt with propane sultone is water-soluble independently of pH values, and is described as having utility as emulsifying agents, dispersing agents, flocculating re-agents, and the like.

This British Patent makes no mention of the application of the modified poly-α-olefine as a component of a polymer blend. In fact, as will be shown later in Comparative Examples, while it is possible to blend this modified polymer with, for example, polypropylene, it has poor compatibility and no spinnability adequate for practical use.

Known as modified poly-α-olefines is modified polypropylene formed with a terminal block segment of a polar block copolymer containing an amino group reacted with propane sultone in situ (U.S. Pat. 3,399,249). This patent states that the terminal blocked modified polypropylene obtained can be dyed with both acid and basic dye types by the conventional dyeing procedures.

This patent makes no mention of the application of this modified polypropylene as a component of a polymer blend. In fact, as will be shown later in Comparative Examples, this modified polymer, when blended, for instance, with polypropylene, and processed by melt spinning, does not lend itself readily to improved dyeability adequate for practical use, and with cationic dyes; in particular, it is wholly devoid of practical utility. Furthermore, incorporating the modified polymer containing this terminal block segment in quantities large enough to ensure improved dye-receptability by blending into a polyolefine not only gives inescapably adverse effects on the desirable properties of the polyolefine, but also entails the further disadvantage of raising the cost.

Further, there has been made known a modified polymer prepared by reacting an ethylene-vinyl alcohol copolymer having hydroxyl groups with sultone (French patent application 150,716). According to this proposal it is stated that the modified polymer so obtained is useful as ion-exchange membranes.

The French patent application makes no mention whatsoever concerning the use of the modified polymer as a component of a polymer blend. In fact, as will be shown in Comparative Examples, this modified polymer, when blended, for instance, with polypropylene and melt spun, exhibits degrading heat stability at the time of melt molding and very poor spinnability.

The purpose of this invention is to offer a crystalline poly-α-olefine composition that is capable of exhibiting, without substantially deteriorating the desirable physical and chemical properties inherent to crystalline poly-α-olefines, improved dyeability with basic dyes, in particular with cationic dyes, improved printability with printing ink, excellent heat stability at the time of melt molding, together with excellent spinnability and other favorable propensities for various melt-shapings.

Examples of the crystalline poly-α-olefine (A) useful in the present invention are polymers or copolymers of α-olefines having from 2 to 6 carbon atoms, for example, polyethylene, polypropylene, poly-1-butene, poly-4-methyl-1-pentene; or crystalline ethylene-propylene copolymer (propylene content 80 mol percent or more, preferably 85 mol percent or more; ethylene content 80 mol percent or more, preferably 85 mol percent or more), crystalline ethylene-1-butene copolymer (ethylene content 85 mol percent or more, or 1-butene content 85 mol percent or more), propylene-1-butene copolymer (propylene content 85 mol percent or more, or 1-butene content 85 mol percent or more), or admixtures thereof.

The olefinic units constituting the water-insoluble modified olefine copolymers forming one component (B) of the composition claimed by this invention are preferably α-olefins having from 2 to 6 carbon atoms, ethylene or propylene being most preferred. The monomer units constituting the modified copolymer (B) of the composition of the present invention consist of alkali metal salts of sulfonalkyl ester of acrylic acid and/or methacrylic acid, preferably salts or potassium salts. The water-insoluble modified poly-α-olefine (B) consists preferably of 85 to 99.99 mol percent of α-olefin units and 15 to 0.01 mol percent of the units of formula (1).

If desired, the copolymer may further contain free carboxyl groups and/or metal salts thereof.

The water-insoluble modified olefine copolymer (B) constituting a component of the composition of the present invention can be synthesized by a macro-molecular reaction in which olefine copolymers or olefine graft copolymers containing units of unsaturated carboxylic acid or units of derivatives thereof such as its esters and salts (referred to hereafter simply as olefine copolymer, as the occasion may demand) are made to react with sulfonalkylizers represented by sultones such as 1,3-propane sultone and 1,4-butane sultone. For example, in reacting the sultone with the water-insoluble olefine copolymers consisting of olefines and the alkaline metal salts of acrylic acid and/or methacrylic acid, all that is required is to maintain the mixture constantly stirred at a certain temperature between 0° C. and 300° C. under a pressure ranging between reduced atmospheric pressure to 50 atmospheres, with or without use of diluents such as hydrocarbons and halogenated hydrocarbons, in the presence or in the absence of catalysts such as amines and basic compounds of alkaline metals. The same procedure is followed in reacting the sultone with the olefine copolymers consisting of olefines and acrylic acid and/or methacrylic acid or the ammonium salts thereof, wherein sulfonalkylation is carried out after the alkali metal salt of the olefine copolymers has been prepared. The olefine copolymers to be sulfonalkylated are synthesized by a conventionally known method.

The modified olefine copolymers (B) that constitute a component in the composition of the present invention can be synthesized either by graft-copolymerizing the sulfonalkyl esters of acrylic acid and/or methacrylic acid, or the derivatives thereof, with polyolefines, or, preferably, by a random copolymerization of the olefine with the aforementioned esters. For example, the copolymerization of ethylene with the sodium salts of sulfopropylester of acrylic acid or the sodium salts of sulfopropylester of methacrylic acid can be carried out in the presence of a radical catalyst at temperatures ranging from 40° C. to 300° C., with the olefine maintained at a pressure of 500 kg./cm.$^2$ to 4000 kg./cm.$^2$. Copolymerization of the olefines with sulfonalkylesters of acrylic acid and/or methacrylic acid, or salts such as the ammonium salt thereof, can be carried out in the same way, wherein, however, it is necessary to convert the copolymers obtained into alkali metal salts. Graft-copolymerizing the alkali metal salts of sulfonalkylesters of acrylic acid and/or methacrylic acid to the olefine polymers can be carried out in the same manner as is conventionally known for the graft-copolymerization of the olefine polymers.

The modified olefine copolymers (B) prepared from graft-copolymers as the material, compared with those that are prepared from the aforementioned random copolymers as the material, show slightly poorer compatibility with, for example, polypropylene, and their formation into fibers finer than 5 denier is found to be difficult.

They are, however, quite usable as films and other molded articles.

In order to synthesize the water-insoluble modified olefine copolymer (B), it is preferable to make use of a macromolecular reaction.

In the modified olefine polymers mixed with olefine polymers, as described in the present invention, alkali metal salt units of sulfonic groups are bonded to the olefine copolymers. It is this sulfonic salt group that largely contributes to the improved dyeability. The sulfonic salt bonded to the olefine copolymer also contributes to excellent compatibility with olefine polymers, making it possible to obtain a homogeneous composition, and further, because it is bonded to the olefin copolymer by an ester bond, it shows excellent stability to heat.

The composition of the olefine polymers (A) and the modified olefine copolymers (B) containing sulfonic salts is produced by common methods, i.e., by use of various blenders, mixers, kneaders and rolls, wherein any of the additives such as antioxidants, ultra-violet absorbents, slip-agents, and copper inhibitors, or pigments may be incorporated. While the amount to be mixed of the modified olefine copolymers containing sulfonic salts varies according to the fixed amount of sulfonic salts, preparation should preferably be such that the ratio of the sulfonic salt in the composition is in the range of 0.001 to within 1.5 meq. sulfonic salts to one gram of the composition. If the ratio is less than 0.001 meq. to one gram of the composition, the olefine polymer composition will show insufficiently improved dyeability, while if the ratio exceeds 1.5 meq., the properties of the olefine polymer composition will deteriorate.

The composition of the present invention can be of the form of melt-shaped articles obtainable by means of various molding methods, such as compression molding, injection molding, or extrusion molding. As examples of such articles may be listed, for instance, filaments, fibers, tows, yarns, and the like, and articles made thereof, such as a non-woven cloth, woven cloth or knit; films, foils, sheets, boards, pipes and other melt-shaped articles of diversified shape. This composition may also take the form of raw material for powder, granule, chip, flake and other composition of melt-shaping.

The conditions to be used in preparing the above fabricated articles are not different from those used in the molding of common olefine polymers or olefine polymer composition.

The composition of this invention or article molded therefrom has great affinity for dyestuffs, and shows excellent dyeability with basic dyestuffs, in particular, with cationic dyestuffs. It further exhibits excellent fastness to sunlight, laundering and dry-cleaning. It also has great affinity for adhesives as well as for printing ink, and further possesses a high level of antistatic property.

The testing and evaluation of spinnability and dyeability in the following Examples were performed as described below.

(I) Spinnability Test

The sample was first pelletized at 210° C., and then melt-spun using a melt spinning machine (having a spinneret with 80 holes of 0.5 mm. diameter) at 270° C. The filament extruded from the spinneret was made to pass through water at boil and drawn to three times the original length. The spinnability was evaluated by the maximum spinning speed at which the filament went through the process of melt spinning and drawing without breaking, and by the denier size of the filament.

Note: The greater the maximum spinning speed, the better is the spinnability, and the smaller the filament size, the better is the spinnability.

(II) Dyeability Test

A dye bath was prepared by dissolving a cationic dye, Sevron Red L (trade name of a product Du Pont) in a water solution of acetic acid (0.5 g./liter) and a non-ionic detergent (2 g./liter). The drawn filament (obtained by the method described in (I)) was immersed in the dye bath with the good-to-liquor ratio of 1:50, to a dye concentration of 3 percent owf, and dyeing was conducted for one hour at 98° C. The evaluated dyeability was indicated by dye exhaustion in percent.

EXAMPLE 1

100 grams of ethylene-acrylic acid copolymer (ethylene content 98 mol percent, acrylic acid content 2 mol percent; melt index 1000 g./10 minutes or more, $[\eta]=0.15$) was dissolved in 1 liter of refined toluene heated to 100° C. 100 milliliters of 1 N ethanolic solution of NaOH (ethanol concentration 95 percent by weight, water 5 percent by weight) was then added and, the mixture agitated for 30 minutes. The generated product was given a thorough washing with ethanol and water until all the excess NaOH was eliminated, and then dried under reduced pressure. Examination of the product with IR spectroscopy showed that the carboxylic groups contained in the ethyleneacrylic acid copolymer had been converted to sodium salts. Next, 100 grams of polyethylene containing the sodium carboxylate and 8.5 grams of 1,3-propane sultone were placed in 1 liter of refined toluene and agitated for 30 minutes at a temperature of 105° C. The product was thoroughly rinsed, and dried under reduced pressure, and 108 grams of sodium-sulfopropylated ethylene copolymer was recovered as a product. (Melt index 60 grams/10 minutes; $[\eta]=0.17$). In the IR spectrum chart of the product, there were observed an absorption in the vicinity of 1200 cm.$^{-1}$ (due to the presence of sulfonic salts) and an absorption in the vicinity of 1730 cm.$^{-1}$ (due to the presence of carboxylic esters) in a marked degree, whereas the absorption in the vicinity of 1570 cm.$^{-1}$ due to the carboxylic salts that had been recognized in the feedstock ethylene copolymer had completely disappeared. Elemental analysis showed that sulfur was contained in the amount of 0.63 meq. per gram of the product.

The modified ethylene copolymer containing this sodium sulfonate was mixed with the powder of propylene homopolymer ([η]=2.1) to prepare a composition containing 0.096 meq. per gram of the composition of sulfonic salts. Tests for spinnability and dyeability were conducted on this composition.

Comparative Example 1

In accordance with the method described in U.S. Pat 3,399,249 (British Pat. 1,110,995) polypropylene having a terminal block consisting of tetrahydrofurfuryl amine was prepared, and then reacted with 1,3-propane sultone.

This modified propylene copolymer was mixed with the powder of propylene homopolymer ([η]=2.1) to prepare a composition 0.096 meq. per gram of the composition of sulfur. Tests for spinnability and dyeability on this composition was carried out in a manner described in the foregoing.

Comparative Example 2

Polypropylene having terminal blocks containing 4-vinyl-pyridine was prepared after the manner of Comparative Example 1, and then reacted with 1,3-propane sultone. A composition was then prepared, after the manner of Comparative Example 1, which contained sulfur in an amount of 0.096 meq. per gram of the composition.

Comparative Example 3

Following the method described in French patent application 150,716 (Dutch application 6,906,526), ethylene-vinylalcohol copolymer was made to react with 1,3-propane sultone to yield modified ethylene copolymer. After the manner of Comparative Example 1, there was prepared a composition containing sulfonic groups in an amount of 0.096 meq. per gram of the composition.

Comparative Example 4

Following the method described British Pat. 1,042,719, a synthetic product of ethylene-maleic anhydride copolymer (ethylene content 50 mol percent) and 1,3-propane sultone was prepared, and following the manner described in Comparative Example 1, a composition was prepared which contained sulfonic groups in a amount of 0.096 meq. per gram of said composition.

Comparative Example 5

The ethylene-vinylalcohol copolymer used in Comparative Example 3 was mixed with propylene homopolymer ([η]=2.1), a composition was prepared which contained hydroxy groups in an amount of 0.096 meq. per gram of the composition.

Comparative Example 6

The ethylene-acrylic acid copolymer used in Example 1 was mixed with propylene homopolymer ([η]=2.1), a composition was prepared which contained carboxyl groups in an amount of 0.096 meq. per gram of the composition.

Comparative Example 7

Propylene homopolymer ([η]=2.1 dl./g.) was tested as to the maximum spinning speed, final filament size, tenacity and dye exhaustion.

TABLE 1

| | Maximum spinning speed (m./min.) | Final filament size (denier) | Tenacity (g./denier) | Dye exhaustion (percent) |
|---|---|---|---|---|
| Example 1 | 1,000 | 0.5 | 4.5 | 95 |
| Control Example: | | | | |
| 1 | 100 | 6 | 3.5 | 10 |
| 2 | 100 | 6 | 3.0 | 10 |
| 3 | 50 | (¹) | | ³ 70 |
| 4 | (²) | | | ⁴ 5 |
| 5 | 1,000 | 0.5 | 4.3 | 0 |
| 6 | 1,000 | 0.5 | 4.4 | 5 |
| 7 | 1,000 | 0.5 | 4.5 | 0 |

¹ Undrawable.  ² Unspinnable.
³ Stable drawing being impractical because of filament breaking, measurements were taken with undrawn filament.
⁴ Since spinning was not feasible, a sheet 0.03 mm. thick was compression-molded at 270° C., and dyeing test was conducted on this sheet. The figures given here are values obtained with respect to said sheet.

EXAMPLE 2

Two liters of refined p-xylene, 100 grams of commercially available ethylene/methacrylic acid/sodium methacrylate copolymer (Trademark SURLYN A, Du Pont; ethylene content 85 wt. percent, sodium content 1.1 meq. per gram ethylene copolymer, melt index 5.0), and 25 grams of 1,3-propane sultone were placed in a 5-liter glass reactor. They were heated under reflux for one hour during which agitation was maintained. The generated mixture was then placed in a mixer and thoroughly washed with acetone, followed by drying at reduced pressure, to obtain 112.5 grams of white powdered product which is a sulfopropylated ethylene copolymer. After extracting this substance with boiling acetone for 24 hours, the IR-spectrum of the extracted product was examined. In said IR-spectrum it was observed that absorption at 1570 cm.$^{-1}$ (CO of sodium carboxylate) of the copolymer had disappeared, while a strong absorption at 1730 cm.$^{-1}$ (CO of the ester) had newly appeared. The elemental analysis carried out on this substance further showed the presence of sulfur in a ratio of 0.96 meq. per gram of the sulfopropylated ethylene copolymer, and the atomic absorption analysis conducted on the substance disclosed the content of sodium was 0.97 meq. per gram of the sulfopropylated ethylene copolymer.

The modified ethylene copolymer containing sodium sulfonate units was mixed with a homopolymer of propylene ([η]=2.1) to form a composition containing sodium sulfonate in an amount of 0.096 meq. per gram of the composition. Tests for spinnability and dyeability on the composition were carried out in the manner described in the foregoing.

EXAMPLE 3

10 grams of the copolymer which was the same material as used in Example 2, 1.5 grams of 1,3-propane sultone, and 100 grams of propylene homopolymer, were mixed in a Brabender mixer at 200° C. for 5 minutes in a nitrogen atmosphere at 100 r.p.m. The mixing was then conducted under vacuum for another 10 minutes, with the temperature and the speed of the Brabender revolution held as above, and unreacted 1,3-propane sultone was removed. As a result, 111.1 grams of a composition was recovered which consisted of sulfopropylated copolymer and propylene homopolymer. The elemental analysis carried out on the composition showed that sulphur was contained in an amount of 0.097 meq. per gram of the composition. Tests for spinnability and dyeability on said composition were carried out.

Comparative Example 8

Modified propylene copolymer containing acrylic acid in an amount of 0.98 meq. per gram copolymer was obtained by grafting acrylic acid onto propylene homopolymer in chlorobenzene.

Reflux heating applied to the copolymer placed in a mixed solution of 200 m-liter of 10% water solution of potassium hydroxide and 1 liter of methanol for one hour converted the carboxylic acid group contained in the graft-copolymer into a potassium salt. 100 grams of this copolymer (potassium salt) and 26 grams of 1,3-propane sultone were placed in 2 liters of refined p-xylene, and after applying reflux heating for one hour with constant agitation, a thorough washing was given with methanol, followed by drying under reduced pressure, and 109.3 grams of sulfonpropylated copolymer was yielded. Elemental analysis showed that this copolymer contained sulfur, and atomic absorption analysis showed that it contained potassium, in amount, of 0.87 meq. and 0.89 meq., respectively, per gram of this copolymer.

This modified copolymer was mixed with propylene homopolymer ($[\eta]=2.1$) to form a composition containing 0.1 meq. of sulfonate salts per gram of the composition.

Tests for spinnability and dyeability on said composition were carried out.

EXAMPLE 4

A composition prepared by mixing 10 grams of the modified ethylene copolymer of Example 1 with 90 grams of ethylene-propylene copolymer ($[\eta]=2.43$, and containing 3 mol percent of ethylene units) was pelletized at 210° C.

Tests for spinnability and dyeability on the composition were carried out.

TABLE 2

| | Maximum spinning speed (m./min.) | Final size of filament (denier) | Tenacity (g./denier) | Dye exhaustion (percent) |
|---|---|---|---|---|
| Example 2 | 1,000 | 0.5 | 4.5 | 95 |
| Example 3 | 1,000 | 0.5 | 4.4 | 95 |
| Comparative example 8 | 1,000 | 0.5 | 4.0 | ¹ 95 |
| Example 4 | 1,000 | 0.5 | 4.0 | 95 |

¹ A microscopic examination showed, however, that the dispersion of the dyestuffs in the fiber was poorer than in the case of Example 1. A film having a thickness of 0.02 mm. was molded from this composition at 210° C., and a similar dyeing test conducted on the film resulted in dyeing to deep shade satisfactory for practical use.

EXAMPLE 5

A composition was prepared by mixing 100 grams of the modified ethylene copolymer of Example 1 with 900 grams of homopolymer of ethylene (product of Mitsui Petrochemical Industries, Ltd., registered trademark being Hizex 5000F), and after pelletizing the composition at 190° C., a film with a thickness of 0.03 mm. was molded at 220° C. This film was subjected to a dyeing test conducted in the same manner as described in the foregoing, and an excellent dyeing was obtained.

EXAMPLE 6

A composition was prepared by mixing 100 grams of the modified ethylene copolymer, which was prepared using 1,4-butanesultone instead of 1,3-propanesultone in Example 1, with 900 grams of 4-methyl-1-pentene homopolymer ($[\eta]=3.61$), and after pelletizing it at 240° C., it was molded at 260° C. into a film 0.02 mm. thick. This film, tested for dyeing performance as in Example 5, was dyed to a deep shade.

What is claimed is:

1. A crystalline poly-α-olefine composition comprising a blend of:
   (A) a crystalline poly-α-olefine, and
   (B) a water-insoluble modified poly-α-olefine comprising a random copolymer of α-olefine units and units of the following formula

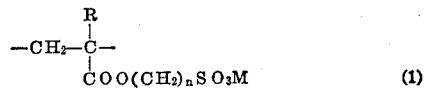

wherein R is a hydrogen atom and/or methyl group, M is an alkali metal, and $n$ is an integer of 3 to 4; said units of formula (1) being derived from a monomer selected from the group consisting of:
   (a) acrylic acid, methacrylic acid or the alkali metal salts thereof further reacted with a sultone; and
   (b) sulfonalkyl ester of acrylic acid, methacrylic acid or the alkali metal salts thereof, the amount of said units of formula (1) is 0.001 to 1.5 Meq. per gram of said composition.

2. The composition of claim 1, wherein the amounts of said units of formula (1) is 0.001 to 1.5 meq. per gram of said composition.

3. The composition of claim 1, wherein said water-insoluble modified poly-α-olefine consists of 85 to 99.99 mol percent of α-olefine units and 15 to 0.01 mol percent of the units of formula (1).

4. The composition of claim 1, wherein said poly-α-olefine (A) is a member selected from the group consisting of polyethylene, polypropylene, poly-1-butene, poly-4-methyl-1-pentene, crystalline ethylene/propylene copolymer, crystalline ethylene/1-butene copolymer, crystalline propylene/1-butene copolymer and blends thereof.

5. The composition of claim 1 which is in the form of a melt-shaped article.

6. A crystalline poly-α-olefine composition comprising a blend of:
   (A) polypropylene or crystalline propylene/ethylene copolymer, and
   (B) a water-insoluble modified random copolymer of ethylene units and units of the following formula

wherein R is a hydrogen atom and/or methyl group, M is sodium or potassium, and $n$ is 3 or 4, said units of formula (1) being derived from a monomer selected from the group consisting of:
   (a) acrylic acid, methacrylic acid or the alkali metal salts thereof further reacted with a sultone; and
   (b) sulfonalkyl ester of acrylic acid, methacrylic acid and alkali metal salts thereof the amount of said units of formula (1) is 0.001 to 1.5 meq. per gram of said composition, and said polymer (B) consisting of 85 to 99.99 mol percent of ethylene unit and 15 to 0.001 mol percent of the units for formula (1).

7. The composition of claim 1 wherein said units of formula (1) are derived from a monomer selected from the group (a).

8. The composition of claim 1 wherein said units of formula (1) are derived from a monomer selected from the group (b).

References Cited
UNITED STATES PATENTS 3,284,541  11/1966  Stanton et al. _____ 260—878

FOREIGN PATENTS 995,801  6/1965  Great Britain _____ 260—897

PAUL LIEBERMAN, Primary Examiner
C. J. SECCURO, Assistant Examiner

U.S. Cl. X.R.

260—876 R, 876 B; 264—78

UNITED STATES PATENT OFFICE
CERTIFICATE OF CORRECTION

Patent No. 3,842,147          Dated October 15, 1974

Inventor(s) Toshiharu TOMATU ET AL

It is certified that error appears in the above-identified patent and that said Letters Patent are hereby corrected as shown below:

In the Heading, insert the following:

-- Claims priority, application Japan, November 4, 1971, No. 46-87146/71. --

Signed and sealed this 24th day of December 1974.

(SEAL)
Attest:

McCOY M. GIBSON JR.
Attesting Officer

C. MARSHALL DANN
Commissioner of Patents